UNITED STATES PATENT OFFICE.

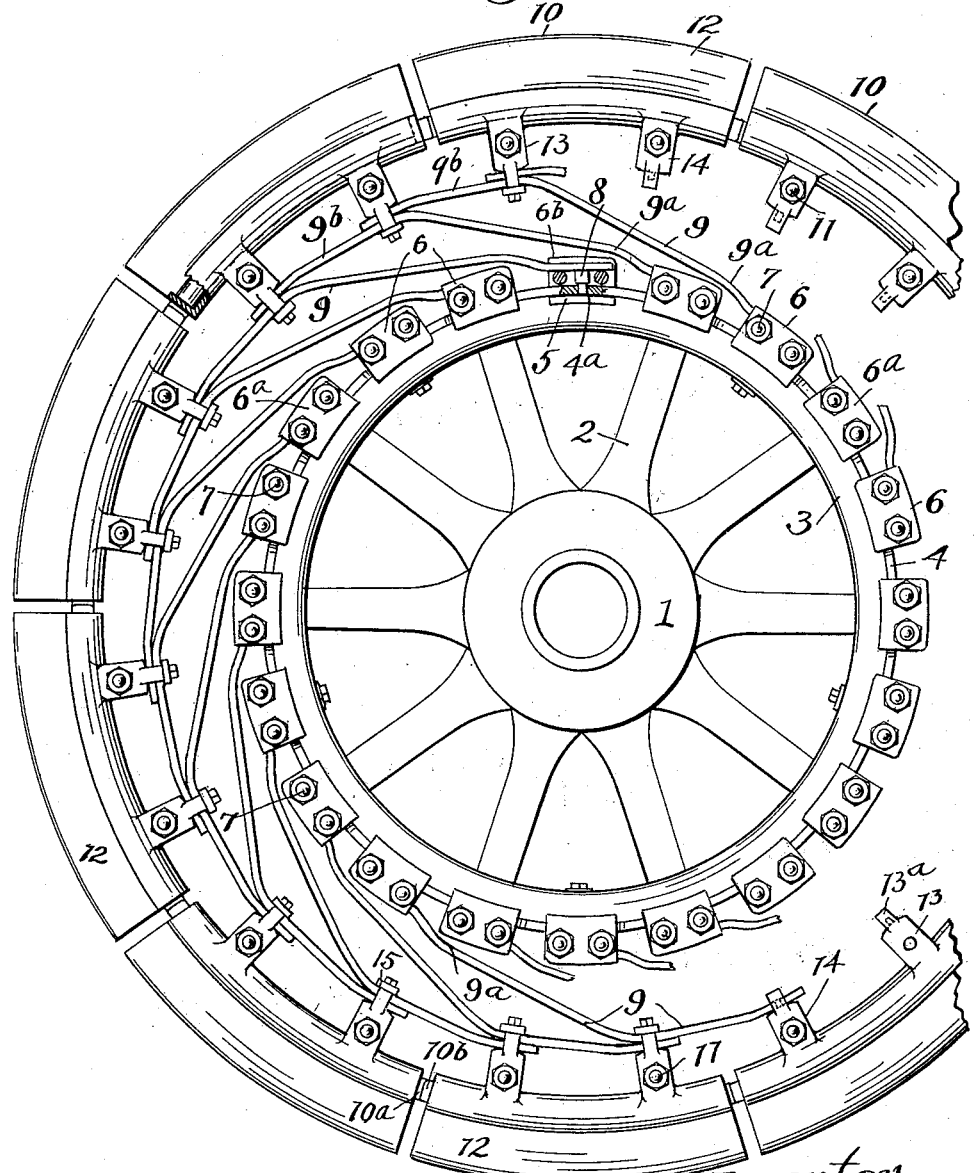

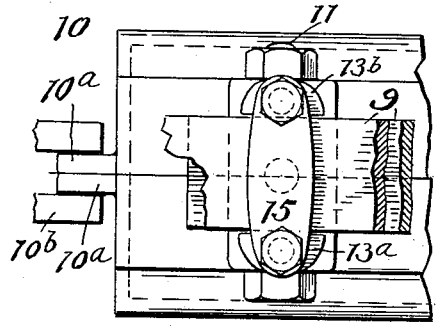
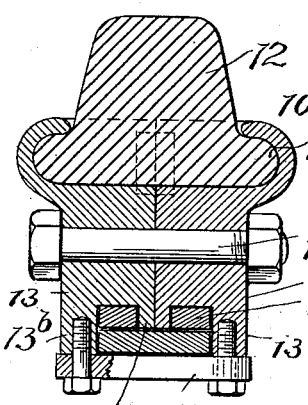
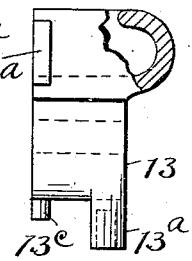
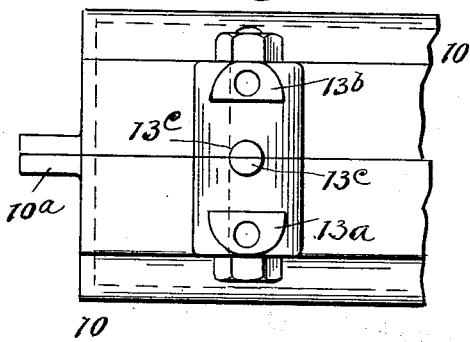
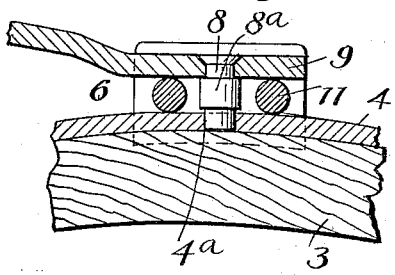
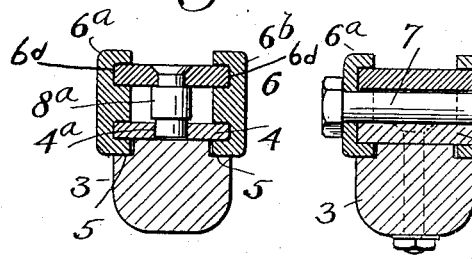
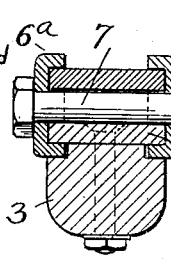

WILLIAM MORRIS, OF CLEVELAND HEIGHTS, OHIO.

RESILIENT WHEEL.

1,159,786.  Specification of Letters Patent.  Patented Nov. 9, 1915.

Application filed October 19, 1914. Serial No. 867,361.

*To all whom it may concern:*

Be it known that I, WILLIAM MORRIS, a citizen of the United States, residing at Cleveland Heights, in the county of Cuyahoga and State of Ohio, have invented a certain new and useful Improvement in Resilient Wheels, of which the following is a full, clear, and exact description.

This invention relates to a resilient wheel of the type wherein a series of independently movable block tire sections are resiliently mounted upon an inner rim or felly.

The object of the invention is to provide a resilient wheel of the type mentioned, wherein the load which is carried upon the wheel will be distributed throughout the spring elements of the wheel.

Reference should be had to the accompanying drawings, forming a part of the specification, in which—

Figure 1 is a side elevation of a resilient wheel embodying my invention. Fig. 2 is a transverse section through a portion of one of the blocks of the tire. Fig. 3 is a front elevation of a portion of one of the blocks. Fig. 4 is a plan view looking upward upon a portion of one of the blocks. Fig. 5 is a view similar to Fig. 4 with the springs and retaining parts therefor removed. Fig. 6 is a sectional elevation showing the manner of securing a spring to the felly of the wheel. Fig. 7 is a section at right angles to the showing in Fig. 6; and Fig. 8 is a transverse section of the showing in Fig. 6.

The wheel of my invention comprises an inner portion made up of a hub, felly, and connecting spokes and an outer tread portion which is made up of substantially independent sections, which sections are supported from the felly by a series of overlapping resilient elements, each of which is at one end secured to the felly and at its opposite end secured to a section of the tread; and intermediate of its end each resilient element has a sliding engagement with a tread section.

Each resilient element is preferably a strip of spring steel secured to the felly in a manner such that it extends substantially tangential with respect to the felly, and in an overlapping series.

The hub is indicated at 1, and a series of radiating spokes are shown at 2, which support a felly 3. Upon the outside of the felly is an iron band or hoop 4 which is shrunk or secured upon the felly 3 in any desired manner. The felly 3 is provided with grooves upon opposite sides thereof and adjacent clips 6, which grooves are indicated at 5 in Fig. 7. These grooves extend inwardly beneath the band or hoop 4, so that the band or hoop overhangs the groove.

Coöperating with the felly of the wheel, or more particularly speaking, with the hoop 4 are a series of retaining clips or anchors which are generally represented at 6. Each retaining clip or anchor comprises a pair of oppositely disposed side pieces $6^a$ and $6^b$. The side pieces are provided with grooves which are adapted to engage with the projecting edges of the hoop 4, and the upper portion of the side pieces $6^a$ and $6^b$ are also provided with grooves represented at $6^d$ which are adapted to receive the edges of one of the spring elements of the wheel.

The side pieces $6^a$ and $6^b$ are secured together by bolts 7 which extend transversely of the felly of the wheel and between the spring element engaged by the plates $6^a$ and $6^b$ and the hoop 4. In the drawings I have shown two such bolts 7 coöperating with each pair of side plates $6^a$ and $6^b$.

The end of each spring element which is engaged by the side plates of a retaining clip 6, is positively held against movement by a pin 8 which extends through a conical opening centrally disposed in the spring and near the end thereof. Each retaining pin is provided with an enlarged central portion $8^a$ which is of sufficient width to occupy the space between the end of a spring element and the band 4. The upper part of the retaining pin 8 is swaged so as to practically form a riveted connection between each spring element and the retaining pin associated therewith. The lower part of each retaining pin 8 extends into one of a series of openings which are formed in the band 4,— these openings being represented at $4^a$. It will thus be seen that the end of each spring element is retained against lateral movement by the side plates of each retaining clip 6, and is retained against longitudinal movement by the pin 8 which engages with each spring element and with the band 4. As will be apparent from an inspection of the drawing, the number of retaining clips or anchors which are employed is the same in number as the spring elements utilized to form the resilient portion of the wheel, and these anchors are equally spaced and distributed throughout the peripheral length of the felly.

Each spring element is bent near the end secured to anchors 6, as indicated at $9^a$, so as to be free of the adjacent edge or end of the retaining clip or anchor which is next to it. And adjacent its outer end each spring element is bent, as indicated at $9^b$, so as to extend substantially parallel with the felly, and further, each of the spring elements are, to a certain extent, overlapping. These spring elements resiliently support sections of a tire or tread portion which are generally represented at 10. Each of the tread sections is split longitudinally forming two parts which are secured together by transversely extending bolts, as represented at 11. In the drawing I have shown two bolts as securing the sections of the tread together, but I do not limit myself in this respect. Each of the tread sections is formed with a pair of oppositely disposed inwardly extending flanges which form pockets adapted to receive blocks 12 of resilient material. These blocks are formed with outwardly extending bead portions $12^a$ which are engaged by and beneath the inwardly extending flanges of the sections 10. This construction will be well understood by those skilled in the art, as it is a well known method of securing solid resilient tires of the type shown in this application.

Each tread section is at one end provided with a single projecting lug $10^a$ which lug is split,—one-half of the lug being carried by each of the halves of the section. However, when the parts of the tread section are together, the effect is to form a single projecting lug. From the opposite end of each tread section there extends a pair of spaced projecting lugs $10^b$. When adjacent sections are alined in the wheel, they are arranged so that the single lug at one end of a section extends between the pair of lugs upon an adjacent section. This construction permits free radial movement of the sections but prevents side movement or twisting movement between adjacent sections.

The various tread sections which are the ground engaging portions of the wheel, are substantially independent of each other, except as there is a certain connection between the sections through the mounting of the springs.

Each section 10 is provided with a plurality of pairs of inwardly extended lugs. Two such pairs are shown and indicated at 13 and 14. The lugs of each pair 13 and 14 are oppositely disposed and in transverse alinement. I prefer to pass the bolts 11 which connect the two parts of each tread section through the oppositely disposed portions of lugs 13 and 14.

From each of the oppositely disposed portions of the lugs 13 there are extensions $13^a$ and $13^b$ and between the extensions $13^a$ and $13^b$ there is upon each lug 13 a short teat which is represented at $13^c$. The teat is split, half being carried by each of the oppositely disposed lugs 13.

The end of each spring element 9 is provided with an opening of proper size to receive the teat $13^c$, thus forming an anchor for the end of the spring element, and, as will be clear, the end of the spring element extends between the lugs $13^a$ and $13^b$ which have previously been described. Therefore the end of each spring element is held against side movement and against any longitudinal movement, which would be independent of the movement of the tire sections themselves.

Between each pair of projections $13^a$ and $13^b$ and below the spring element which engages with the projection $13^c$, there extends a second spring element, which engages with and may slide upon that portion of the spring element which coöperates with the projection $13^c$. The spring element which has the sliding engagement just described is that spring element which is next in the order of arrangement of the series of spring elements to the spring element which is secured upon teat $13^c$. A cross strap 15 is at its opposite ends secured to the projections $13^a$ and $13^b$ in any desired manner, and this strap 15 extends beneath the spring element which is free to slide between the projections $13^a$ and $13^b$. The strap 15 therefore serves to hold both the spring element which has the engagement with the teat $13^c$ and the spring element which may slide, but the last mentioned spring element is prevented from having any lateral movement by virtue of its engagement with the extensions $13^a$ and $13^b$.

The construction and arrangement of the pair of lugs 14 is similar in all respects to that described with respect to lugs 13, as well as the manner of coöperation between the spring elements and the pair of lugs. In fact all the lugs upon the tread sections and their engagement with the spring elements are similar.

The spring element which at its end is secured to the teat $13^c$ will pass between the pair of lugs 14 and have a sliding engagement with these lugs, being retained in proper position by a strap joining the pair of lugs 14 similar to the strap 15.

It will be seen from the drawing and previous description that each section of the tread has two points of support with respect to the resilient elements, and further that each resilient element has an operative connection at two points with respect to the tread sections, one of the connections being fixed and the other a sliding connection; and further at each point of support for a tread section there is a fixed connection between one of the resilient elements and a sliding engagement between one of the resilient elements.

When the load is placed upon a wheel and the wheel is in motion, the load will be in succession transferred to succeeding sections of the tire, and each block or section as it is pressed inwardly with respect to the hub of the wheel will cause the resilient elements with which it is connected to be depressed. Due to the fact that each succeeding spring element is connected with the spring elements of the block under pressure, the force which is causing a depression of the springs supporting the particular block or section bearing the weight, to distribute the load and pass it on until the entire reaction due to the load is absorbed throughout the various resilient elements embodied in the wheel, so that the resilient elements which are connected with any particular section of the tire which is bearing the weight of the vehicle does not bear this weight alone, but shares the weight with the other resilient elements of the wheel.

Having thus described my invention, what I claim is:—

1. A resilient wheel, comprising an inner portion, a plurality of substantially tangentially extending spring elements secured to the inner portion, a tread portion comprising a plurality of sections, each section having two points of support with respect to the spring elements, each point of support being secured to a spring element, and also having a sliding engagement with a spring element.

2. A resilient wheel comprising an inner portion having a felly, an outer or tread portion comprising a plurality of sections, a plurality of spring elements secured at one end to the felly and extending outwardly and circumferentially, each section of the tread being supported at two points upon a spring element and spring elements intermediate those before mentioned which support portions of adjacent tread sections.

3. A resilient wheel comprising an inner portion having a felly, an outer or tread portion comprising a plurality of sections, a plurality of spring elements secured at one end to the felly and extending outwardly and circumferentially, each section of the tread having an end of a spring element secured to one part of the section and another part of the section having a sliding engagement with another part of the same spring element and spring elements intermediate those just mentioned supporting portions of adjacent tread sections.

4. A resilient wheel comprising an inner portion having a felly, an outer or tread portion comprising a plurality of sections, each section having inwardly extending lugs adjacent the ends thereof, a plurality of overlapping spring elements, each secured at one end to the felly, certain spring elements being held at one of their ends to one of the lugs upon each section, and slidably secured to the other lug upon the section, and other spring elements intermediate those just mentioned engaging lugs upon adjacent tread sections, one lug fixedly and another lug slidably.

5. A resilient wheel comprising an inner portion having a felly, an outer tread portion comprising a plurality of sections, each section being provided with pairs of transversely spaced lugs adjacent to the ends thereof, a plurality of overlapping leaf spring elements, each having an end secured to the felly and each having its opposite end extend between the lugs of one pair upon a section and secured thereto, an intermediate portion of each spring element extending between the lugs of another pair upon a section and means for retaining the said spring section between said lugs, but permitting the spring element to slide.

6. A resilient wheel comprising an inner portion having a felly and an outer portion comprising a plurality of independent tread sections, a plurality of resilient elements secured to the said felly, each section being supported at two points by the said resilient elements, each point of support comprising a fixed engagement with one spring element and a sliding engagement with an adjacent spring element.

In testimony whereof, I hereunto affix my signature in the presence of two witnesses.

WILLIAM MORRIS.

Witnesses:
A. J. HUDSON,
L. I. PORTER.

Copies of this patent may be obtained for five cents each, by addressing the "Commissioner of Patents, Washington, D. C."